United States Patent Office 3,443,184
Patented May 6, 1969

3,443,184
CIRCUIT ARRANGEMENT FOR CONTROLLING THE SPEED OF A COMMUTATOR OR INDUCTION MOTOR
Jurgen Lemmrich, Hamburg, Germany, assignor, by mesne assignments, to U.S. Philips Corporation, New York, N.Y., a corporation of Delaware
Filed July 28, 1966, Ser. No. 568,435
Claims priority, application Germany, Sept. 4, 1965, F 37,606
Int. Cl. H02p 1/26, 3/18, 5/38
U.S. Cl. 318—227                                14 Claims

ABSTRACT OF THE DISCLOSURE

A speed control circuit for an alternating current motor wherein the motor windings are fed alternating current via controlled rectifiers. An induction machine, adapted to operate as a frequency converter, has the rotor thereof mounted to be driven by the controlled motor and its stator windings supplied from a variable frequency generator. The output from the rotor of the induction machine is compared with the current supplied to the motor, the resultant output being utilized as ignition signals for the controlled rectifiers.

---

Figure 1:
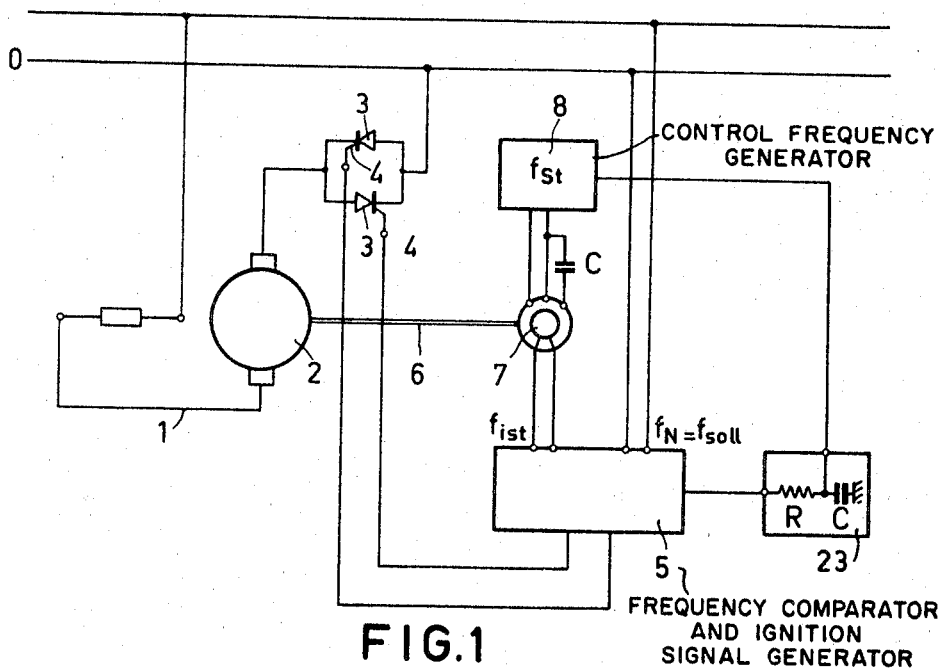

The present invention relates to a motor control circuit and more particularly to a variable frequency control system for controlling motor speed. A circuit arrangement for controlling the speed of a universal or induction motor supplied from an alternating current supply or from a polyphase current supply utilizes controlled rectifiers connected in parallel-opposition in the current supply conductors and operating as switches. The rectifiers are ignited in each half cycle and extinguish automatically at the zero passages of the alternating voltage.

It is known to control the speed of a commutator motor or of an induction motor supplied with an alternating current or a rotatory current. In a known embodiment of a drive system having a circuit arrangement for controlling the speed, the driving machine is constituted by a synchronous motor in which the speed basically depends only upon the supply frequency and not upon the braking torque. A variable supply frequency must therefore be produced for controlling the speed. Such a control arrangement is very complicated, however, since, due to the saturation of the iron in the machine, the variable supply frequency and the supply voltage must be controlled approximately proportionally. Furthermore, these known arrangements are generally arranged for a three-phase supply. Moreover, a synchronous motor falls out of step when the braking torque exceeds a given maximum value, that is to say, it comes to a standstill.

It has also been suggested to control a slip-ring motor in a frequency-analogous manner. This control is effected by keying the rotor current, the frequency of the rotor current being accurately equal to the keying frequency determining the speed and which is to be chosen arbitrarily. Variations of the braking torque are counteracted by equal variations of the driving torque produced by a suitable adjustment of the keying ratio of the keyed current. This keying ratio (ratio between the time in which a current flows and the time in which no current flows) is adjusted automatically in accordance with the loa dtorque. The zero passages of the rotor voltage which mark the instants at which the current is switched on are shifted with respect to the zero passages of the keying voltage which mark the instants of switching off, due to the response of the motor to a load variation. As a result, an increase of the load results in an increase of the keying ratio and a decrease of the load in a decrease of this ratio. The motor thus controlled consequently responds to a load variation with a variation of the phase angle during which a current flows. This action is similar to the variation of the leading or lagging angle of the revolving field occurring in a synchronous motor.

Fluctuations of the speed of motors controlled in a frequency-analogous manner are electronically counteracted. Such a control arrangement is comparatively simple as far as its heavy current and signal processing parts are concerned. However, it has the disadvantage that use is made of slip-rings, and particularly that the enforced switching-off of the rotor current by means of heavy current switches is not reliable in principle. This especially applies to the said frequency-analogous control of slip-ring motors in which the current is switched off at some point or other in a half cycle and not at the instant of the zero passages. Although heavy current switches such as magnetic amplifiers, controlled rectifier tubes or controlled semi-conductor rectifiers (thyristors) can be switched on in a simple manner, they have the disadvantage that in order to switch them off it is required that the voltage between the electrodes passes through zero. Consequently, controlled rectifiers and magnetic amplifiers can be used in a simple and reliable manner only in arrangements in which alternating voltages and currents are switched on during a half cycle of the voltage and are switched off automatically due to the zero passage of the voltage or current. An enforced switching-off is obtained by introducing a voltage of reverse polarity with respect to the forward direction of the rectifier, for example, the voltage across a charged capacitor, into the current circuit of the controlled rectifier. Insufficient charge of the capacitor, not allowing for the recovery time prescribed for the rectifier, an unfavourable sequence in time of the switching-on and switching-off control signals, and many other possible disturbance sources may however be detrimental to the operational reliability of such switching circuit arrangements.

The invention avoids said disadvantages of known circuit arrangements for controlling the speed of a universal or induction motor supplied from an A.C. supply or a polyphase current supply by means of controlled rectifiers connected in parallel-opposition in the current supply conductors and operating as switches, which rectifiers are ignited in each half cycle and extinguish automatically in the zero passages of the alternating voltage. According to the invention, the rotor of the motor drives the rotor of an additional induction machine operating as a frequency converter in the direction of the rotatory field. The stator winding of the additional machine is arranged to be supplied with a current of variable control frequency from a frequency generator, whereby an output voltage dependent upon the speed and upon the control frequency is set up in the rotor winding of the additional induction machine. The frequency of said output voltage is equal to the supply frequency $f_{soll}$ within the control range, and the phase angle of said output voltage with respect to the supply voltage is dependent upon the load. This phase angle determines the phase angle during which a current flows. The output voltage is applied to a frequency comparison device which supplies to the controlled rectifiers ignition signals shifted in time in accordance with the magnitude of the phase angle during which a current flows.

With the circuit arrangement in accordance with the invention, the speed of commutator or of induction motors can be controlled in a frequency-analogous manner independently of the load between zero speed and the nominal speed. The speed is substantially independent of the load and control errors do not occur. A load variation gives rise only to a variation of the phase angle of the rotating rotatory vector of the motor axis with respect to the phase angle of this vector with another load. In principle, any type of switch may be used as the control elements more particularly, switches without mechanical contacts such as magnetic amplifiers, transistors and controlled rectifiers may be used.

In extreme circumstances, such as overload or an abrupt increase of the desired speed, the output frequency $f_{ist}$ may exceed the supply frequency $f_N$ and the prescribed frequency $f_{soll}$. In order to prevent the motor from falling out of step in such cases, according to a further aspect of the invention, the switches are again controlled by ignition signals originating from the frequency comparison device immediately after each zero passage of the current, until a new stable operational condition has been attained. Thus, the full shortcircuit current is applied to the motor so that it is rapidly matched to the changed load or to the increased speed.

If, on the contrary, the load on the motor is abruptly decreased, or if the prescribed speed is abruptly reduced ($f_{ist} < f_N = f_{soll}$), no ignition signals at all are supplied by the frequency comparison device during the time required to attain the new operational conditions and the stable adjustment of the switches. No current flows in the motor and its speed rapidly decreases to the desired value.

It is possible that the speed of the motor does not decrease sufficiently rapidly to the new prescribed value under the action of the self-braking effect of the motor. In this case, according to a further aspect of the invention, a signal is derived from the frequency comparison device which initiates an additional braking effect which can, for instance, be a reverse or Eddy current braking. When the new prescribed speed is attained, the additional braking of the motor is eliminated by a second signal. In this manner, which is known per se, the new prescribed speed can be attained much more rapidly.

The speed of motors controlled by a control arrangement in accordance with the invention, or by other known control arrangements, tend to fluctuate periodically. According to a further feature of the invention, in order to damp these fluctuations, a signal is derived from the fluctuations of the speed by means of which the control frequency signal is frequency or phase modulated. This modulation signal may be supplied by a tachogenerator driven by the motor or it may be derived from the signals which determine the phase angle during which a current flows, and produced in the frequency comparison device by suppressing the high frequency components of the latter signals by means of a low-pass filter.

Figure 2:
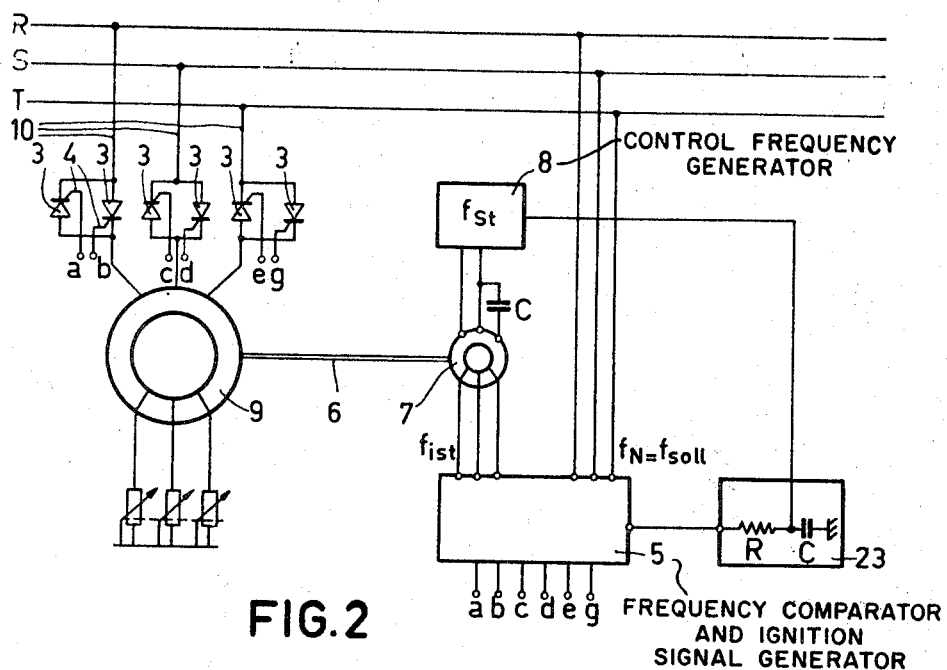
Figure 3:
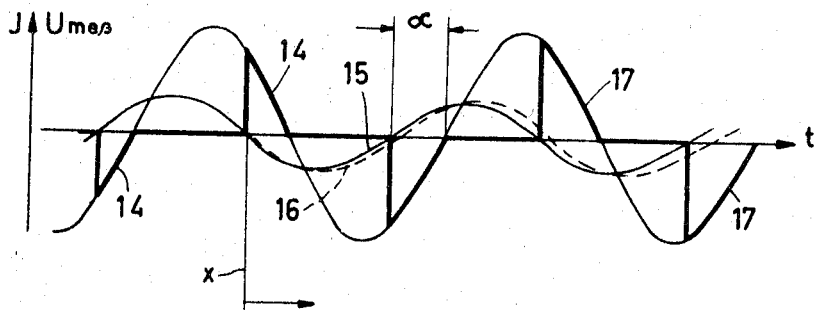
Figure 4:
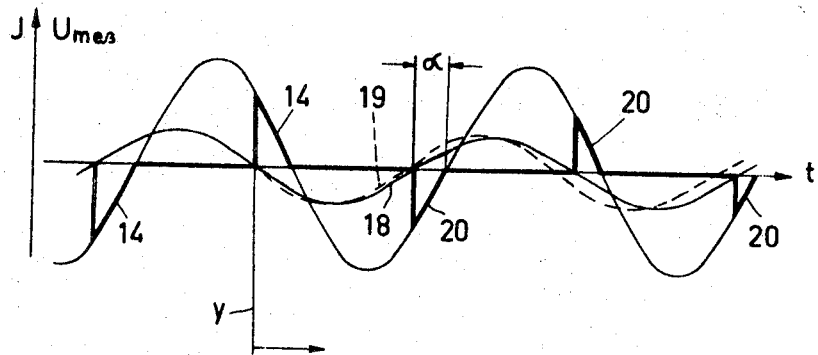
Figure 5:
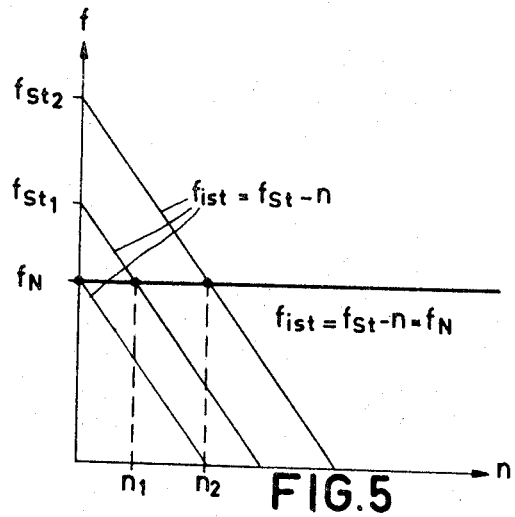
Figure 6:
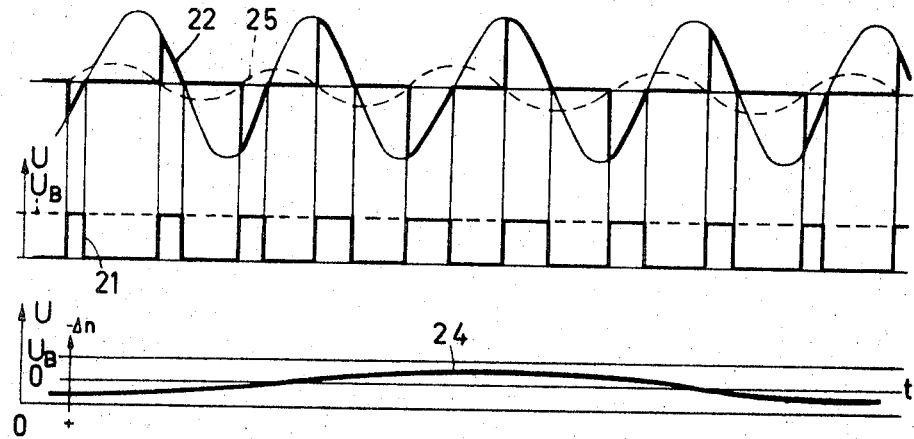
Figure 7:
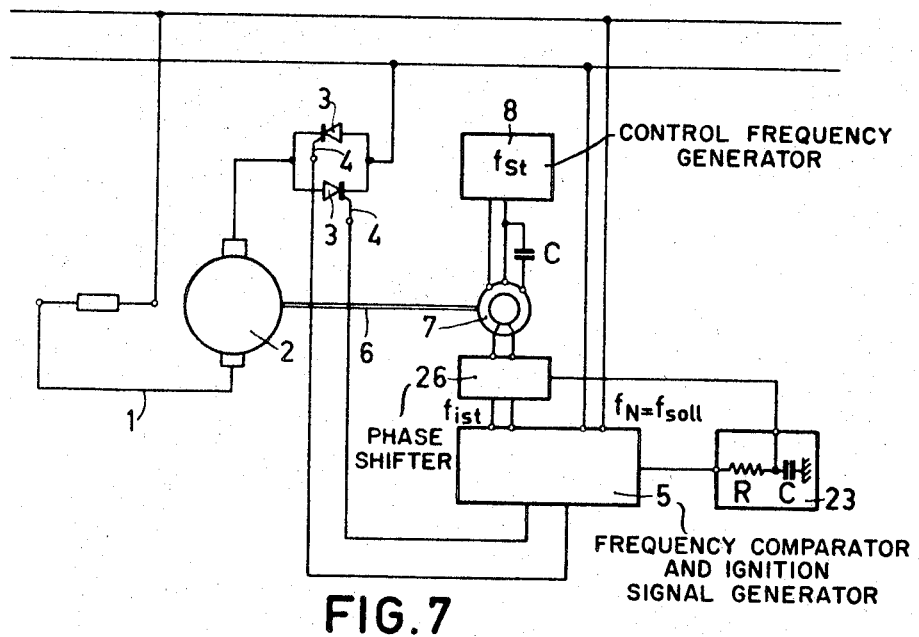
Figure 8:
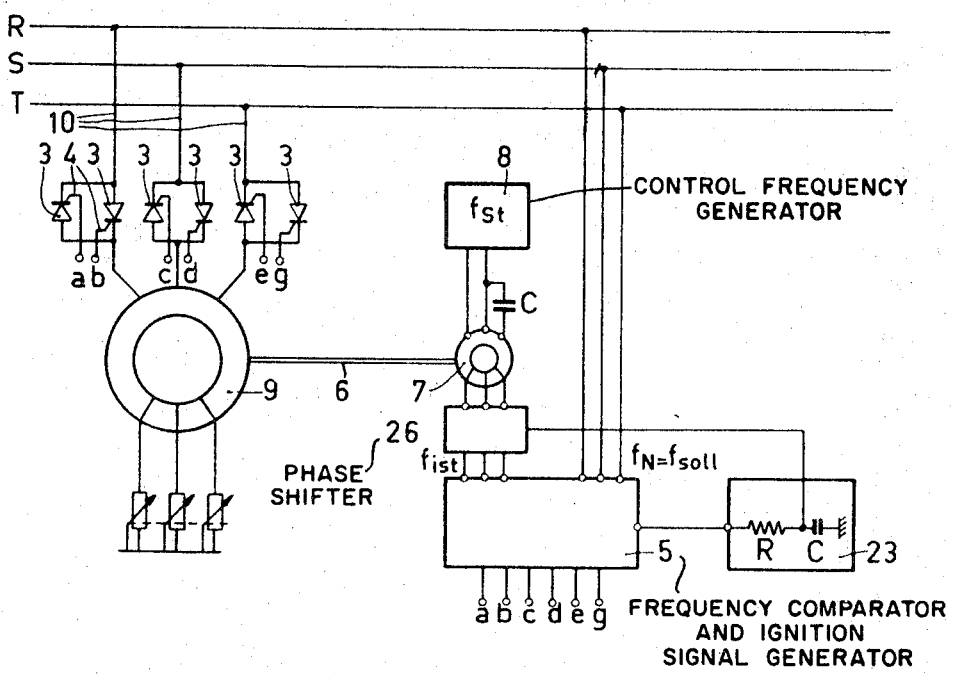

The invention will now be described more fully with reference to the embodiments shown in the accompanying drawings, in which:

FIG. 1 shows a block diagram of an arrangement for controlling a universal motor in which the fluctuations of the speed are damped by frequency modulation of the control frequency signal, FIG. 2 is a block diagram of an arrangement for controlling an induction machine (shortcircuit or slip-ring induction motor) in which the fluctuations are damped by frequency modulation of the control frequency signal, FIGS. 3 and 4 show diagrammatically the automatic adjustment of the current time magnitude after an abrupt variation of the load, FIG. 5 is a diagram of the control frequency as a function of the speed of revolution, FIG. 6 illustrates the manner in which the signal indicative of the speed fluctuations is derived from the signal determining the phase angle during which current flows, FIG. 7 shows a block diagram similar to that of FIG. 1 of an arrangement for controlling a universal motor, whereby the fluctuations of the speed are damped by phase modulation of the signal indicative of the measured frequency, and FIG. 8 shows a block diagram differing from that of FIG. 2 in that the speed fluctuations are damped by phase modulation of the signal indicative of the measured frequency.

In FIG. 1, rectifiers 3, for example, thyristors, are connected in parallel-opposition in the supply circuit 1 of a commutator motor 2 connected to an A.C. supply. The rectifiers 3 operate as switches. Ignition signals are applied to their ignition electrodes 4 by a circuit arrangement 5, preferably operating electronically, which serves to compare frequencies and for producing the ignition signals. The current flowing through the switches 3 and the motor 2 from the instant of switching-on to the passage through zero of the current produces the drive torque of the motor. The rotor of the motor 2 is coupled with the rotor of an additional induction machine 7 through a shaft 6. This additional induction machine 7 may be a separate tacho-generator or another small low power machine. The stator of the induction machine 7 is supplied from a control frequency generator 8 with a current having a control frequency $f_{St}$. Since the induction machine 7 is driven in the direction of the rotatory field by the motor to be controlled, the induction machine 7 acts as a frequency converter which converts the control frequency $f_{St}$ to a frequency equal to the supply frequency $f_N$ but shifted in phase with respect thereto;

$$f_{ist} = f_{St} - n = f_N$$

The frequency $f_{ist}$ and the supply frequency $f_N$ are both supplied to the frequency comparator and ignition signal generator 5, which in turn controls the ignition phase of the controlled rectifiers 3 so as to insure that $f_{ist}$ is equal to $f_N$. Since $f_{ist}$ is equal to $f_{St} - n$, the speed $n$ of motor 2 can be controlled by adjusting the frequency $f_{St}$ produced by the control frequency generator 8. A low pass RC filter 23 is connected between the comparator 5 and the control frequency generator 8. The purpose of filter 23 will be explained below.

FIG. 2 shows a circuit arrangement similar to that of FIG. 1 in which the motor to be controlled is a rotatory field motor 9. Again rectifiers 3, for example, thyristors, are connected in the supply conductors 10 of the motor 9. The rectifiers can be switched on by ignition signals produced by the circuit arrangement 5 and applied to the ignition electrodes 4. For the sake of clarity, the connections $a$, $b$, $c$, $d$, $e$ and $g$ between the ignition electrodes 4 and the connecting terminals of the circuit arrangement 5 are omitted.

The rotor of the motor 9 is again connected via the shaft 6 to the additional induction machine 7. The stator of induction machine 7 is fed by the control frequency generator 8 and the rotor winding supplies a voltage having the frequency $f_{ist}$ which is equal to the supply frequency but which is shifted in phase with respect thereto.

Let it be assumed that in either of the circuits of FIGS. 1 and 2, the average value of the active parts 14 (FIGS. 3 and 4) of the current ignited at each zero passage of $f_{ist}$ is sufficiently large to produce an electric torque equivalent to the mechanical braking torque at the given speed $n$. After a load jump—in FIG. 3 an increase of the load initiated at the instant $x$—the motor first rotates at a lower speed since the driving torque produced by the active parts of the current is smaller, under the assumed condition, than the new braking torque. Consequently, the measured frequency 15, $f_{ist} = f_{St-n}$, increases so that, before a phase jump occurs between the supply frequency and $f_{ist}$ the phase angle during which a current flows increases (half cycles of the current 17.) For the sake of clarity, the undisturbed path of the measured frequency 16 is also shown in the drawing.

An increase of the phase angle $\alpha$ during which a current flows results in an increase of the driving torque so that the increase of the braking torque is counteracted.

The behaviour in case of a decrease of the load shown in FIG. 4 can be described in a corresponding manner.

After a decrease of the load at the instant $y$, the driving torque is too large so that the speed of the motor increases and the measured frequency 18 ($f_{ist}$) decreases. For the sake of clarity, the original path of the measured frequency 19 is as shown in the drawing. A phase shift occurs between the supply frequency and $f_{ist}$ such that the active parts of the current 20 become shorter and hence the new driving torque is reduced.

The phase angle $\alpha$ during which current flows must consequently always be adjusted so that with a speed $n$, adjusted by the control frequency $f_{St}$, the electric driving torque is equal to the braking torque. With a difference between the driving torque and the braking torque, the motor is accelerated or braked until a new phase angle has been adjusted such that there is no longer any difference between the two torques. Consequently, a motor controlled in a frequency-analogous manner does not respond to a load variation by a permanent variation of the speed, but only by a variation of the phase angle during which current flows, and by a corresponding single shift of the angle of rotation of the rotating motor shaft.

By varying the control frequency, any speed can now be adjusted within the range lying between exactly $n=0(f_{St}=f_N=f_{soll})$ and the speed of the drive system under no load conditions. The speed under no load conditions of a commutator motor (universal motor) is determined by the supply voltage and that of an induction motor by the frequency of the supply voltage and by the number of pole pairs. At any speed, the load torque is allowed to vary between exactly 0 (phase angle $\alpha$ during which current flows=0) and the torque that can be produced by the machine at the given speed, according to its speed-torque characteristic curve, when the supply voltage is continuously applied (phase angle $\alpha$ during which current flows=$\pi$).

There is a possibility of phase jumps occurring in operation between the supply frequency (equal to the prescribed frequency) and the measured frequency derived from the induction machine. This may be the case when the load torque exceeds the maximum driving torque that can be produced at the given speed and also when the speed of the motor must be increased by an abrupt variation of the control frequency. In both cases, the measured frequency will exceed the supply frequency (prescribed frequency).

In case of an abrupt variation of the control frequency which must cause the speed of the motor to decrease, the measured frequency becomes lower than the supply frequency. The circuit arrangement 5, serving for the comparison of frequencies and for producing the ignition signals, is therefore designed so that:

(1) In case $f_{ist}=f_N=f_{soll}$, ignition signals for the switches 3 are supplied at the instant of the zero passage of the measured frequency.

(2) In case $f_{ist}=>f_N=f_{soll}$, ignition signals again control the switches 3 immediately after each zero passage of the current and a continuous current flows ($\alpha=\pi$).

Finally, in case $f_{ist}<f_N=f_{soll}$, no ignition signals at all are produced for the switches 3. Moreover, in case $f_{ist}<f_N=f_{soll}$, a signal may be derived from the circuit arrangement 5 by which an enforced braking of the motor can be initiated (braking due to reversed current flow or to Eddy currents).

With such a control arrangement it may be achieved that the motor behaves statically and dynamically as follows:

(1) Any speed may be adjusted within the range lying between exactly $n=0$ and the nominal speed, while it is possible to vary the braking torque between 0 and a maximum torque determined by the adjusted speed, without involving any permanent deviation from the prescribed speed.

(2) If the load torque exceeds the maximum torque, the motor adjusts its speed to another value according to its speed-torque characteristic curve. Consequently, the motor has the property that it is adapted to emergency conditions and, in contrast to a synchronous machine, it does not stall when the critical torque is exceeded. When the load is reduced, the speed of the motor automatically returns to the prescribed value.

(3) The motor behaves in quite the same manner when it must be accelerated to a higher speed by a jump of the control frequency. A continuous current is supplied to the motor due to the ignition signals until the new prescribed speed has been reached again, that is to say until $f_{ist}=f_N=f_{soll}$.

(4) When the machine must be adjusted to a lower speed by an opposite jump of the control frequency, the supply current is entirely interrupted due to the absence of ignition signals and the speed decreases due to the braking effect of the load. If desired, an enforced braking of the motor can even be initiated by a signal, for example, by reversing the field, by interchanging the successive phases or by Eddy currents. When the new prescribed speed is reached, the motor is no longer braked and the current supply is restored by the ignition signals.

As is the case with synchronous motors, the speed of motors controlled in a frequency-analogous manner has a tendency to fluctuate. These fluctuations are very disturbing and must be suppressed. This is achieved by modulating the control frequency with the correct phase, in frequency or in phase, by a signal produced by the fluctuations. The phase angle $\alpha$ during which current flows is reduced, for example, by an increase of the speed. Conversely, this phase angle is increased by a decrease of the speed. The signal required for the modulation and produced by the speed fluctuations may be supplied, if desired, by an additional tachogenerator driven by the motor. It is simpler, however, to derive the signal produced by the fluctuations from the circuit arrangement 5 serving for comparing frequencies and for producing the ignition signals (FIG. 6), since this signal is already present in the (in this case rectangular) signal 21 which is indicative of the phase angle during which current flows. For the sake of clarity, FIG. 6 shows the active parts of several cycles of the current half-waves 22 and the measured frequency 25 above the signals 21 that determine the phase angle during which current flows.

By means of a simple RC low-pass filter, the signal $\Delta n=F(t)24$ produced by the speed fluctuations can be derived from these rectangular signals of constant amplitude $U_B$ and can be applied to the control frequency generator 8 (FIGS. 1 and 2) for frequency modulation of an same, or to the electrically adjustable phase-shift network 26 (FIGS. 7, 8), for example, a nonstable flip-flop circuit having an adjustable time constant, connected in the lead between the induction machine 7 and the frequency comparison device 5.

What is claimed is:

1. A circuit for controlling the speed of a universal or induction motor energized from an A.C. supply or from a polyphase current supply comprising, a pair of controlled rectifiers connected in parallel-opposition in the current supply conductors to the motor, an induction machine adapted to operate as a frequency converter and having a rotor with a winding thereon which is mechanically driven by the rotor of the motor, a frequency generator adapted to produce a variable control frequency, means coupling the frequency generator output to the stator winding of said induction machine to supply thereto a current of variable control frequency whereby an output voltage that is dependent upon the motor rotational speed and upon said variable control frequency is induced in the rotor winding of the induction machine, the frequency of said output voltage being equal to the supply frequency within the control range and the phase angle of said output voltage with respect to the supply voltage being dependent upon the motor load, a frequency comparison device, means for applying said output voltage to said frequency comparison device, means for deriving ignition signals from said frequency comparison device that are shifted in time in accordance with the magnitude of said output voltage phase angle, and means for applying said ignition signals to the control electrodes of said controlled rectifiers thereby to control the phase angle during which a current flows in the rectifiers.

2. A circuit as claimed in claim 1, wherein said frequency comparison device is adapted to produce ignition signals immediately after each zero passage of the current when the frequency of said output voltage exceeds the supply frequency.

3. A circuit as claimed in claim 1 wherein said frequency comparison device includes means for suppressing said ignition signals when the frequency of said output voltage is lower than the supply frequency.

4. A circuit as claimed in claim 2, wherein said frequency comparison device is adapted to produce a first control signal when the frequency of said output voltage is lower than the supply frequency and a second control signal when the frequency of the output voltage again becomes equal to the supply frequency, and wherein the circuit further includes electric braking means adapted to be rendered operative by said first control signal and to be rendered inoperative by said second control signal.

5. A circuit as claimed in claim 1 further comprising means for deriving a modulation signal that is proportional to the speed fluctuations of the motor, and means for applying said modulation signal to said frequency generator so as to modulate the control frequency.

6. A circuit as claimed in claim 5, wherein said modulation signal deriving means comprises a tachogenerator driven by the motor.

7. A circuit as claimed in claim 5 wherein said modulation signal deriving means includes a low pass filter coupled to the output of said frequency comparison device for suppressing the high frequency components of the ignition signals.

8. A circuit as claimed in claim 1 further comprising means for deriving a modulation signal that is proportional to the speed fluctuations of the motor, and means for coupling said modulation signal to said frequency generator so as to phase modulate the control frequency.

9. A circuit as claimed in claim 1 further comprising means for deriving a modulation signal that is proportional to the speed fluctuations of the motor, phase shift means coupled between the rotor winding of said induction machine and the input of said frequency comparison device, and means for applying said modulation signal to said phase shift means so as to phase modulate said output voltage in accordance with said modulation signal.

10. A circuit as claimed in claim 8 wherein said modulation signal deriving means comprises a low pass filter coupled to the output of said frequency comparison device.

11. A circuit as claimed in claim 9 wherein said modulation signal deriving means comprises a low pass filter coupled to the output of said frequency comparison device.

12. A motor speed control system comprising, a source of AC voltage, a pair of anti-parallel connected controlled rectifiers serially connected between said voltage source and the motor input, frequency converter means comprising an induction machine having its rotor mechanically driven by the motor rotor, a variable frequency generator having its output coupled to the stator winding of said induction machine, the output voltage induced in the rotor winding of said induction machine being determined by the motor speed and the frequency of the current supplied to said stator winding by the variable frequency generator, said output voltage having a phase angle relative to the AC voltage that is dependent upon the motor load, frequency comparison means having a first input coupled to the rotor of said induction machine and a second input coupled to said AC voltage source, and means for coupling the ignition signals developed by said comparison means to the control electrodes of said controlled rectifiers to control the firing angle thereof in a manner to drive the motor at a speed that maintains the frequency of said rotor output voltage equal to the frequency of said AC voltage source.

13. A system as claimed in claim 12 further comprising a low pass filter coupled to the output of said comparison means for deriving a modulation signal that is proportional to the speed fluctuations of the motor, and means for coupling said modulation signal to said frequency generator so as to modulate the frequency or phase of the current supplied to the stator winding of said induction machine.

14. A system as claimed in claim 12 wherein the frequency of said frequency generator is adjustable to alter the motor speed.

References Cited
UNITED STATES PATENTS 3,320,506    5/1967    Humphrey _____ 318—227 XR
3,348,110    10/1967    Koppelmann _____ 318—227

ORIS L. RADER, *Primary Examiner.*

G. Z. RUBINSON, *Assistant Examiner.*

U.S. Cl. X.R.
318—231

PO-1050
(5/69)

UNITED STATES PATENT OFFICE
CERTIFICATE OF CORRECTION

Patent No. 3,443,184        Dated May 6, 1969

Inventor(s)   JURGEN LEMMRICH

It is certified that error appears in the above-identified patent and that said Letters Patent are hereby corrected as shown below:

Column 1, line 67, "loa dtorque" should read -- load torque --;
Column 5, line 58, before "Finally" insert -- (3) --;
Column 6, line 49, "an" should read -- the --;
Column 6, line 50, "nonstable" should read -- monostable --;

Signed and sealed this 16th day June 19 70.

(SEAL)
Attest:

Edward M. Fletcher, Jr.
Attesting Officer

WILLIAM E. SCHUYLER, JR.
Commissioner of Patents